(12) United States Patent
Stefansson et al.

(10) Patent No.: US 10,858,715 B2
(45) Date of Patent: *Dec. 8, 2020

(54) DUAL HARDNESS STEEL ARTICLE

(71) Applicant: ATI PROPERTIES LLC, Albany, OR (US)

(72) Inventors: Njall Stefansson, Canonsburg, PA (US); Ronald E. Bailey, Pittsburgh, PA (US); Glenn J. Swiatek, Palos Heights, IL (US)

(73) Assignee: ATI PROPERTIES LLC, Albany, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/142,009

(22) Filed: Sep. 26, 2018

(65) Prior Publication Data
US 2019/0024204 A1 Jan. 24, 2019

Related U.S. Application Data

(60) Continuation of application No. 14/867,081, filed on Sep. 28, 2015, now Pat. No. 10,113,211, which is a
(Continued)

(51) Int. Cl.
*C21D 1/18* (2006.01)
*C21D 7/13* (2006.01)
(Continued)

(52) U.S. Cl.
CPC ............... *C21D 9/42* (2013.01); *B21B 1/00* (2013.01); *B21B 1/02* (2013.01); *B21B 1/04* (2013.01);
(Continued)

(58) Field of Classification Search
CPC ....... B21B 1/00; B21B 1/22; B21B 2001/225; B21B 1/227; B21B 3/00; B21B 3/02;
(Continued)

(56) References Cited

U.S. PATENT DOCUMENTS 1,016,560 A 2/1912 Giolitti
1,563,420 A 12/1925 Johnson et al.
(Continued)

FOREIGN PATENT DOCUMENTS

CN 1944715 A 4/2007
CN 101906588 A 12/2010
(Continued)

OTHER PUBLICATIONS

A Collection of Translated Essays in Heat Treatment (IV)—Vacuum Heat Treatment Special, Shanghai Institute of Machine Building Technology, Jan. 31, 1978, p. 10. (Year: 1978).*
(Continued)

*Primary Examiner* — Michael E. La Villa
(74) *Attorney, Agent, or Firm* — Robert J. Toth; K&L Gates LLP

(57) ABSTRACT

A dual hardness steel article comprises a first air hardenable steel alloy having a first hardness metallurgically bonded to a second air hardenable steel alloy having a second hardness. A method of manufacturing a dual hard steel article comprises providing a first air hardenable steel alloy part comprising a first mating surface and having a first part hardness, and providing a second air hardenable steel alloy part comprising a second mating surface and having a second part hardness. The first air hardenable steel alloy part is metallurgically secured to the second air hardenable steel alloy part to form a metallurgically secured assembly, and the metallurgically secured assembly is hot rolled to provide a metallurgical bond between the first mating surface and the second mating surface.

15 Claims, 2 Drawing Sheets

Related U.S. Application Data division of application No. 12/986,213, filed on Jan. 7, 2011, now Pat. No. 9,182,196.

(51) Int. Cl.

| | | |
|---|---|---|
| *C21D 7/04* | (2006.01) | |
| *C21D 9/42* | (2006.01) | |
| *C21D 9/50* | (2006.01) | |
| *C21D 8/02* | (2006.01) | |
| *F41H 5/04* | (2006.01) | |
| *C22C 38/44* | (2006.01) | |
| *C22C 38/08* | (2006.01) | |
| *C22C 38/04* | (2006.01) | |
| *C22C 38/02* | (2006.01) | |
| *B21B 1/00* | (2006.01) | |
| *B21B 1/02* | (2006.01) | |
| *B21B 1/04* | (2006.01) | |
| *B21B 1/22* | (2006.01) | |
| *B21B 1/24* | (2006.01) | |
| *B21B 1/26* | (2006.01) | |
| *B21B 1/46* | (2006.01) | |
| *B21B 3/02* | (2006.01) | |
| *B21B 3/00* | (2006.01) | |
| *B32B 15/18* | (2006.01) | |
| *B32B 15/04* | (2006.01) | |
| *B32B 15/01* | (2006.01) | |
| *B23K 35/02* | (2006.01) | |
| *B23K 20/227* | (2006.01) | |
| *B23K 20/08* | (2006.01) | |
| *B23K 20/04* | (2006.01) | |
| *F41H 5/00* | (2006.01) | |
| *B23K 20/02* | (2006.01) | |
| *C22C 38/00* | (2006.01) | |
| *B23K 103/04* | (2006.01) | |

(52) U.S. Cl.
CPC ............... *B21B 1/22* (2013.01); *B21B 1/227* (2013.01); *B21B 1/24* (2013.01); *B21B 1/26* (2013.01); *B21B 1/46* (2013.01); *B21B 1/463* (2013.01); *B21B 1/466* (2013.01); *B21B 3/00* (2013.01); *B21B 3/02* (2013.01); *B23K 20/021* (2013.01); *B23K 20/023* (2013.01); *B23K 20/04* (2013.01); *B23K 20/08* (2013.01); *B23K 20/227* (2013.01); *B23K 35/0255* (2013.01); *B23K 35/0261* (2013.01); *B32B 15/01* (2013.01); *B32B 15/011* (2013.01); *B32B 15/04* (2013.01); *B32B 15/043* (2013.01); *B32B 15/18* (2013.01); *C21D 1/18* (2013.01); *C21D 7/04* (2013.01); *C21D 7/13* (2013.01); *C21D 8/0226* (2013.01); *C21D 9/50* (2013.01); *C22C 38/002* (2013.01); *C22C 38/02* (2013.01); *C22C 38/04* (2013.01); *C22C 38/08* (2013.01); *C22C 38/44* (2013.01); *F41H 5/00* (2013.01); *F41H 5/04* (2013.01); *F41H 5/045* (2013.01); *F41H 5/0442* (2013.01); *B21B 2001/028* (2013.01); *B21B 2001/225* (2013.01); *B23K 2103/04* (2018.08); *B32B 2311/30* (2013.01); *B32B 2571/02* (2013.01); *C21D 2211/008* (2013.01); *Y10T 428/12958* (2015.01); *Y10T 428/12965* (2015.01); *Y10T 428/12972* (2015.01); *Y10T 428/12979* (2015.01); *Y10T 428/26* (2015.01)

(58) Field of Classification Search
CPC ....... B21B 1/02; B21B 2001/028; B21B 1/04; B21B 1/24; B21B 1/26; B21B 1/46; B21B 1/463; B21B 1/466; B32B 15/01; B32B 15/011; B32B 15/043; B32B 2571/02; B32B 15/18; B32B 15/04; B32B 2311/30; F41H 5/045; F41H 5/0442; F41H 5/00; F41H 5/04; C21D 7/04; C21D 8/0226; C21D 9/42; C21D 2211/008; C21D 9/50; C21D 7/13; C21D 1/18; C22C 38/08; C22C 38/02; C22C 38/002; C22C 38/44; C22C 38/04; B23K 20/227; B23K 20/08; B23K 35/0255; B23K 35/0261; B23K 2303/04; B23K 2103/04; B23K 20/04; B23K 20/021; B23K 20/023; Y10T 428/12965; Y10T 428/12972; Y10T 428/12958; Y10T 428/26; Y10T 428/12979

See application file for complete search history.

(56) References Cited

U.S. PATENT DOCUMENTS

| | | | |
|---|---|---|---|
| 2,249,629 | A | 7/1941 | Hopkins |
| 2,562,467 | A | 7/1951 | Kinnear, Jr. |
| 3,379,582 | A | 4/1968 | Dickinson |
| 3,785,801 | A | 1/1974 | Benjamin |
| 3,888,637 | A | 6/1975 | Taguchi et al. |
| 3,944,442 | A | 3/1976 | Donachie |
| 4,443,254 | A | 4/1984 | Floreen |
| 4,484,959 | A | 11/1984 | Boucher et al. |
| 4,645,720 | A | 2/1987 | Pircher et al. |
| 4,788,034 | A | 11/1988 | Brandis et al. |
| 4,832,909 | A | 5/1989 | Schmidt et al. |
| 4,871,511 | A | 10/1989 | Smith, Jr. et al. |
| 4,917,969 | A | 4/1990 | Pircher et al. |
| 4,941,927 | A | 7/1990 | Hickey, Jr. et al. |
| 5,122,336 | A | 6/1992 | Roux et al. |
| 5,129,966 | A | 7/1992 | Rao |
| 5,268,044 | A | 12/1993 | Hemphill et al. |
| 5,332,545 | A | 7/1994 | Love |
| 5,720,829 | A | 2/1998 | Finkl et al. |
| 5,749,140 | A | 5/1998 | Polito et al. |
| 5,866,066 | A | 2/1999 | Hemphill et al. |
| 5,997,665 | A | 12/1999 | Brisson et al. |
| 6,080,359 | A | 6/2000 | Davidson |
| 6,087,013 | A | 7/2000 | Chilson |
| 6,360,936 | B1 | 3/2002 | Dilg et al. |
| 6,361,883 | B1 | 3/2002 | Dilg et al. |
| 7,462,251 | B2 | 12/2008 | Beguinot et al. |
| 7,475,478 | B2 | 1/2009 | McCrink et al. |
| 7,537,727 | B2 | 5/2009 | Dilmore et al. |
| 7,776,162 | B2 | 8/2010 | Mizoguchi et al. |
| 7,926,180 | B2 | 4/2011 | McCrink et al. |
| 7,981,521 | B2 | 7/2011 | Bailey et al. |
| 8,361,254 | B2 | 1/2013 | Bailey et al. |
| 8,444,776 | B1 | 5/2013 | Bailey et al. |
| 8,529,708 | B2 | 9/2013 | Locke |
| 9,121,088 | B2 | 9/2015 | Bailey et al. |
| 9,182,196 | B2 | 11/2015 | Stefansson et al. |
| 9,593,916 | B2 | 3/2017 | Bailey et al. |
| 9,657,363 | B2 | 5/2017 | Stefansson et al. |
| 9,951,404 | B2 | 4/2018 | Bailey et al. |
| 10,113,211 | B2 * | 10/2018 | Stefansson ............... B21B 1/00 |
| 2003/0145911 | A1 | 8/2003 | Hoffmann et al. |
| 2011/0067788 | A1 | 3/2011 | Swiatek et al. |
| 2011/0197745 | A1 * | 8/2011 | Locke ....................... C23C 8/22 |
| | | | 89/36.02 |
| 2016/0017455 | A1 | 1/2016 | Stefansson et al. |
| 2017/0299343 | A1 | 10/2017 | Bailey et al. |

FOREIGN PATENT DOCUMENTS

| | | |
|---|---|---|
| DE | 2142360 A1 | 4/1972 |
| DE | 4107417 A1 | 12/1991 |
| DE | 4344879 A1 | 7/1995 |
| EP | 051401 A1 | 5/1982 |
| EP | 327042 A1 | 8/1989 |

(56) References Cited

FOREIGN PATENT DOCUMENTS

| | | |
|---|---|---|
| EP | 0731332 A2 | 9/1996 |
| EP | 1111325 A2 | 6/2001 |
| EP | 2036992 A1 | 3/2009 |
| FR | 2106939 | 5/1972 |
| GB | 763442 | 12/1956 |
| GB | 874488 | 8/1961 |
| GB | 2054110 A | 2/1981 |
| JP | S47-31808 B | 8/1972 |
| JP | S47-31809 | 12/1972 |
| JP | S49-9899 A | 1/1974 |
| JP | 57-41351 A | 3/1982 |
| JP | 57-83575 A | 5/1982 |
| JP | 58-157950 A | 9/1983 |
| JP | 58-199846 A | 11/1983 |
| JP | 59-6356 A | 1/1984 |
| JP | 59-47363 | 3/1984 |
| JP | 60-29446 A | 2/1985 |
| JP | H01-296098 A | 11/1989 |
| JP | 4-26738 A | 1/1992 |
| JP | 4-26739 A | 1/1992 |
| JP | 4-197588 A | 7/1992 |
| JP | 07-173573 A | 7/1995 |
| JP | 2000-31397 A | 11/2000 |
| JP | 57-161049 A | 10/2002 |
| RU | 2090828 C1 | 9/1997 |
| RU | 2102688 C1 | 1/1998 |
| RU | 2139357 C1 | 10/1999 |
| RU | 2297460 C1 | 4/2007 |
| RU | 2309190 C2 | 10/2007 |
| RU | 2381284 C2 | 2/2010 |
| RU | 2388986 C2 | 5/2010 |
| SU | 404889 | 10/1973 |
| SU | 685711 A1 | 9/1979 |
| UA | 84607 C2 | 11/2008 |
| WO | WO 2004/111277 A1 | 12/2004 |
| WO | WO 2009/018522 A1 | 2/2009 |
| WO | WO 2011/037759 A2 | 3/2011 |
| WO | WO 2012/094160 A2 | 7/2012 |

OTHER PUBLICATIONS

Armox™ 600T (Armox 600S) Data Sheet, SSAB Oxelösund AB, Jun. 6, 2006.
Armor Steel, Mars 300 Ni+, 2 pages.
Armor Steel, Mars 300, 4 pages.
"K12® Dual Hardness Armor Plate", Technical Data Sheet, Allegheny Ludlum, 2002.
"Allegheny Ludlum AL 600™ (UNS Designation N6600) Nickel-Base Alloy", Technical Data Blue Sheet, Allegheny Ludlum Corporation, Pittsburgh, PA, 1998.
Hickey et al., "Comparing a Split Heat of ESR/VAR 4340 Steel", Metal Progress, Oct. 1985, pp. 69-74.
"Steels Double Up for Composites," The Iron Age, Nov. 16, 1967, pp. 70-72.
Rathbone, A.M. "Review of Recent Armor Plate Developments", Blast Furnace and Steel Plant, Jul. 1968, pp. 575-583.
ATI 600-MIL® Ultra High Hard Specialty Armor, Version 4; Aug. 10, 2010.
ATI 500-MIL® High Hard Specialty Armor; Version 5; Aug. 10, 2010.
ATI-K12®-MIL Dual Hard Armor Plate; Version 3; Sep. 10, 2009.
ATI-K12®-MIL Dual Hard Armor Plate; Version 4; Aug. 10, 2010.
Military Specification MIL-A-12560H (MR); Nov. 28, 1990.
Military Specification MIL-DTL-32332 (MR); Jul. 24, 2009.
Military Specification MIL-DTL-46100E (MR); Jul. 9, 2008.
Military Specification MIL-DTL-12560J (MR); Jul. 24, 2009.
Military Specification MIL-A-46099C; Sep. 14, 1987.
Military Specification MIL-A-46100D (MR) with int. amendment 2; Jul. 13, 2007.
ASTM International, Standard Specification for Steel Bars, Designation: A29/A29M-05, Carbon and Alloy, Hot Wrought, General Requirements for, 2005, pp. 1-16.
Alloy Digest, Data on World Wide Metals and Alloys, AISI 4820 (Nickel-Molybdenum Carburizing Steel), Nov. 1974, 2 pages.
Data Sheet entitled "VascoMax T-200/T-250/T-300" Teledyne Vasco 1985, pp. 2-11.
Definition of "cross rolling", The Metals Handbook Desk Edition, 2nd Edition, published by ASM International of Metals Park, Ohio, 198, p. 17.
Sulfide Inclusions in Steel, Proceedings of an International Symposium, Nov. 7-8, 1974, Port Chester, New York, pp. 206, 255-256.
Metals Handbook, Tenth Edition, vol. 1, Properties and Selection: Irons, Steels, and High-Performance Alloys, J.R. Davis, editor, published by ASM International, Materials Park, OH, 1990, p. 400.
DeArdo and E.G. Hamburg; "Influence of Elongated Inclusions on the Mechanical Properties of High Strength Steel Plate," Sulfide Inclusions in Steel, J.J. de Barbadillo and E. Snape. ed., American Society for Metals, Metals Park, OH; 1975: pp. 309-337; 359.
ASTM International, Standard Test Methods and Definitions for Mechanical Testing of Steel Products: A370-10, approved Jun. 15, 2010, published Jul. 2010, pp. 1-47.
Canale, L. et al., "A Historical Overview of Steel Tempering Parameters", Dec. 31, 2008, Int. J. Microstructure and Materials Properties, vol. 3, Nos. 4/5, pp. 474-525.
Zhang et al., "Microstructure evolution of hot-work tool steels during tempering and definition of a kinetic law based on hardness measurements", Materials Science and Engineering A, 380, Mar. 22, 2004, pp. 222-230.
Crucible Selector—Crucible S7 XL, Crucible Industries, Sep. 10, 2010, 2 pages.
Hardness conversion chart downloaded from www.carbidedepot.com on Feb. 9, 2014.
Showalter et al., "Development and Ballistic Testing of a New Class of Auto-tempered High Hard Steels", ARL-TR-4997, Sep. 2009, pp. 1-36.

* cited by examiner

DUAL HARDNESS STEEL ARTICLE

CROSS REFERENCE TO RELATED APPLICATIONS

This application claims priority under 35 U.S.C. § 120 as a continuation of co-pending U.S. patent application Ser. No. 14/867,081, filed Sep. 28, 2015, which in turn claims priority under 35 U.S.C. § 120 as a division of U.S. patent application Ser. No. 12/986,213, filed Jan. 7, 2011, now issued as U.S. Pat. No. 9,182,196. The disclosure of each such application is incorporated by reference herein in its entirety.

BACKGROUND OF THE TECHNOLOGY

Field of the Technology

The present disclosure is directed to the fields of dual hardness steels and methods of making dual hardness steels.

DESCRIPTION OF THE BACKGROUND OF THE TECHNOLOGY

Roll-Bonded Dual Hardness Steel Armor is a Highly Effective Armor material. One example of this type of steel armor is ATI K12®-MIL Dual Hard armor plate, which is available from ATI Defense, Washington, Pa. USA. ATI K12®-MIL Dual Hard armor is disclosed as one embodiment in U.S. Pat. No. 5,749,140, which is incorporated by reference herein in its entirety. ATI K12®-MIL Dual Hard armor plate is a roll-bonded material having a high hardness front side and a softer back side. In use, the armor's hard front side breaks up and flattens an incoming projectile, and the softer back side captures and further absorbs the energy of the deformed projectile.

Although conventional roll-bonded dual hardness steel armor has substantial ballistic penetration resistance, it is difficult and expensive to produce the material. Complex post roll-bonding heat treatments and other processing are required to achieve desired mechanical and ballistic properties in conventional roll-bonded dual hardness steel armor. In particular, it is necessary to austenitize, oil quench, and temper the material subsequent to roll-bonding. In addition, these process steps can only be conducted on one small section of a roll-bonded plate at a time because excessive warping of the plate otherwise can occur due to differences in thermal expansion coefficients and transformation temperatures of the two roll-bonded alloys.

In addition, after heat treatment, conventional dual-hardness steel armor plates must undergo a complex flattening treatment. Only a limited number of manufacturing locations are properly equipped to carry out the flattening treatment. Also, the need to carry out the flattening treatment on plates effectively limits the size of conventional roll-bonded dual hardness steel armor plates to sizes no greater than about 20×20 inches (50.8×50.8 cm). Larger plates must be fabricated by joining together multiple smaller plates, substantially increasing part cost and fabrication time, as well as potentially negatively affecting the integrity of the part.

Accordingly, a need exists for a method of making roll-bonded dual hardness steel armor that does not require conventional post roll-bonding steps, such as austenitizing and oil quenching, and/or that reduces the need for tempering and complex flattening procedures for many applications. More generally, a need exists for an improved method of making dual hardness steel armor.

SUMMARY

According to one non-limiting aspect of the present disclosure, a dual hardness steel article comprises a first air hardenable steel alloy having a first alloy hardness, and a second air hardenable and auto-tempered steel alloy having a second alloy hardness. In certain embodiments, the first alloy hardness is greater than the second alloy hardness. A metallurgical bond region exists between the first air hardenable steel alloy and the second air hardenable steel alloy.

According to another non-limiting aspect of the present disclosure, a dual hardness steel armor comprises a first air hardenable steel alloy having a first alloy hardness of at least 574 BHN, and a second air hardenable steel alloy having a second alloy hardness in a range of 477 BHN to 534 BHN, inclusive. The first air hardenable steel alloy comprises, in percent by weight, 0.42 to 0.52 carbon, 3.75 to 4.25 nickel, 1.00 to 1.50 chromium, 0.22 to 0.37 molybdenum, 0.20 to 1.00 manganese, 0.20 to 0.50 silicon, up to 0.020 phosphorus, up to 0.005 sulfur, iron, and impurities. The second air hardenable steel alloy comprises, in percent by weight, 0.22 to 0.32 carbon, 3.50 to 4.00 nickel, 1.60 to 2.00 chromium, 0.22 to 0.37 molybdenum, 0.80 to 1.20 manganese, 0.25 to 0.45 silicon, up to 0.020 phosphorus, up to 0.005 sulfur, iron, and impurities. A metallurgical bond region exists between the first air hardenable steel alloy and the second air hardenable and auto-tempered steel alloy.

According to yet another aspect of the present disclosure, a method of making a dual hardness steel armor comprises: providing a first air hardenable steel alloy part comprising a first mating surface and having a first part hardness; and providing a second air hardenable steel alloy part comprising a second mating surface and having a second part hardness. The first part hardness is greater than the second part hardness. The first part and the second part are disposed so that at least a portion of the first mating surface contacts at least a portion of the second mating surface, and the first part and the second part are metallurgically secured to form a metallurgically secured assembly. The metallurgically secured assembly is hot rolled to provide a metallurgical bond between the first mating surface and the second mating surface.

BRIEF DESCRIPTION OF THE DRAWINGS

The features and advantages of methods described herein may be better understood by reference to the accompanying drawings in which.

Figure 1A:
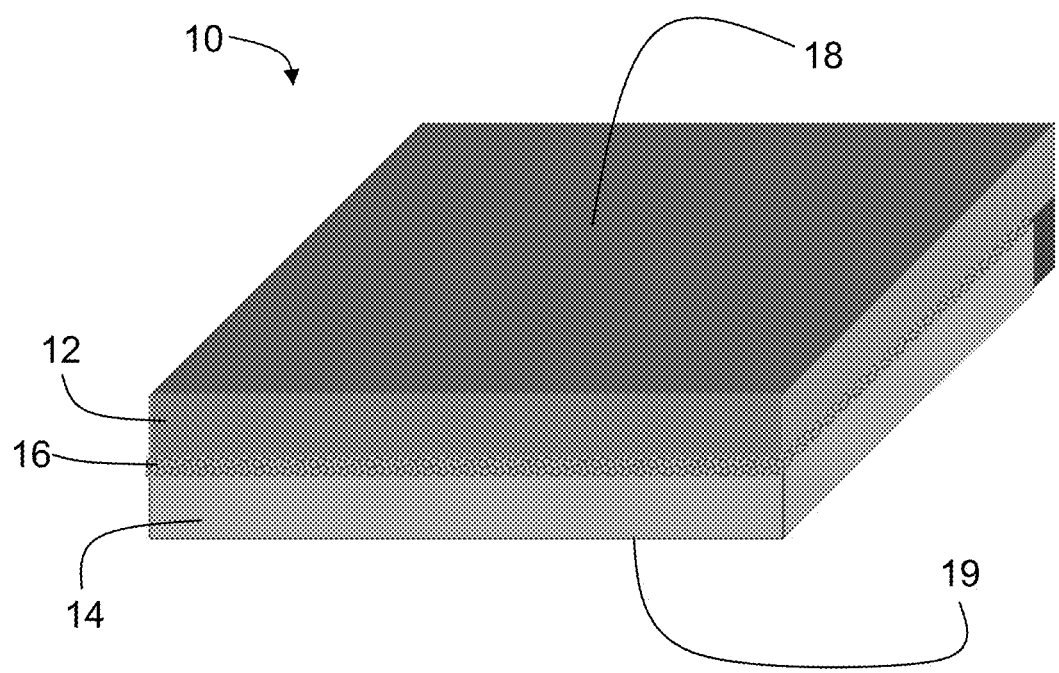
FIG. 1A is schematic perspective view of a non-limiting embodiment of dual hardness steel article according the present disclosure.

The reader will appreciate the foregoing details, as well as others, upon considering the following detailed description of certain non-limiting embodiments according to the present disclosure.

DETAILED DESCRIPTION OF CERTAIN NON-LIMITING EMBODIMENTS

It is to be understood that certain descriptions of the embodiments disclosed herein have been simplified to illustrate only those elements, features, and aspects that are relevant to a clear understanding of the disclosed embodiments, while eliminating, for purposes of clarity, other elements, features, and aspects. Persons having ordinary skill in the art, upon considering the present description of the disclosed embodiments, will recognize that other elements and/or features may be desirable in a particular implementation or application of the disclosed embodiments. However, because such other elements and/or features may be readily ascertained and implemented by persons having ordinary skill in the art upon considering the present description of the disclosed embodiments, and are therefore not necessary for a complete understanding of the disclosed embodiments, a description of such elements and/or features is not provided herein. As such, it is to be understood that the description set forth herein is merely exemplary and illustrative of the disclosed embodiments and is not intended to limit the scope of the invention as defined solely by the claims.

In the present description of non-limiting embodiments, other than in the operating examples or where otherwise indicated, all numbers expressing quantities or characteristics are to be understood as being modified in all instances by the term "about". Accordingly, unless indicated to the contrary, any numerical parameters set forth in the following description are approximations that may vary depending on the desired properties one seeks to obtain in the subject matter according to the present disclosure. At the very least, and not as an attempt to limit the application of the doctrine of equivalents to the scope of the claims, each numerical parameter should at least be construed in light of the number of reported significant digits and by applying ordinary rounding techniques.

Also, any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10. Any maximum numerical limitation recited herein is intended to include all lower numerical limitations subsumed therein and any minimum numerical limitation recited herein is intended to include all higher numerical limitations subsumed therein. Accordingly, Applicants reserve the right to amend the present disclosure, including the claims, to expressly recite any sub-range subsumed within the ranges expressly recited herein. All such ranges are intended to be inherently disclosed herein such that amending to expressly recite any such sub-ranges would comply with the requirements of 35 U.S.C. § 112, first paragraph, and 35 U.S.C. § 132(a).

The grammatical articles "one", "a", "an", and "the", as used herein, are intended to include "at least one" or "one or more", unless otherwise indicated. Thus, the articles are used herein to refer to one or more than one (i.e., to at least one) of the grammatical objects of the article. By way of example, "a component" means one or more components, and thus, possibly, more than one component is contemplated and may be employed or used in an implementation of the described embodiments.

Any patent, publication, or other disclosure material that is said to be incorporated, in whole or in part, by reference herein is incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference. Any material, or portion thereof, that is said to be incorporated by reference herein, but which conflicts with existing definitions, statements, or other disclosure material set forth herein is only incorporated to the extent that no conflict arises between that incorporated material and the existing disclosure material.

The present disclosure includes descriptions of various embodiments. It is to be understood that all embodiments described herein are exemplary, illustrative, and non-limiting. Thus, the invention is not limited by the description of the various exemplary, illustrative, and non-limiting embodiments. Rather, the invention is defined solely by the claims, which may be amended to recite any features expressly or inherently described in or otherwise expressly or inherently supported by the present disclosure.

Aspects of the present disclosure include non-limiting embodiments of dual hardness, or "dual hard", steels and steel articles. Possible forms of steel articles according to the present disclosure include, for example, dual hardness steel armor plates or other forms comprising air hardenable steel alloys.

As used herein, an "air hardenable" steel alloy refers to a steel alloy that does not require quenching in a liquid to achieve its final high hardness. Rather, high hardness may be achieved in an air hardened steel alloy by cooling from high temperature in air alone. Because air hardenable steel alloys do not need to be liquid quenched to achieve high hardness, articles of air hardenable steel, such as, for example, air hardenable steel plates, are not subject to the distortion and excessive warping that can occur through fast liquid quenching. The air hardenable steel alloys according to the present disclosure may be processed using conventional roll-bonding techniques and then air cooled to form a dual hardness steel armor plate or other article, without the need for conventional post-roll bonding heat treatment and liquid quenching to achieve high hardness.

Armor steel alloys can be generally classified according to hardness in among the following groups: (i) Rolled Homogeneous Armor ("RHA") alloys exhibit hardness in the range of 212-388 BHN (Brinell Hardness Number) under U.S. Military Specification MIL-A-12560H, and are also referred to as 400 BHN steel armor alloys; (ii) High Hard Armor ("HHA") alloys exhibit hardness in the range of 477-534 BHN under U.S. Military Specification MIL-DTL-46100E, and are also referred to as 500 BHN steel armor alloys; and (iii) Ultra High Hard Armor ("UHH") alloys exhibit minimum hardness of 570 BHN under U.S. Military Specification MIL-DTL-32332, and also are referred to as 600 BHN steel armor alloys. In addition, air hardenable 700 BHN steel armor alloys are under development. According to certain non-limiting embodiments, air hardenable steel armor alloys made by methods herein that are used to form dual hardness steel armors include, but are not limited to, alloys selected from RHA alloys, HHA alloys, UHH alloys, and potentially 700 BHN steel armor alloys. Currently, the present inventors are not aware of any commercial examples of air hardenable 400 BHN and 700 BHN steel armors.

Figure 1B:
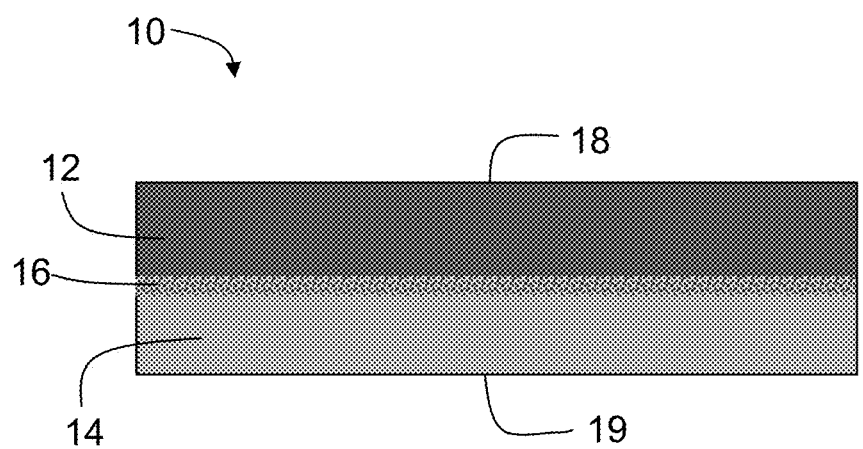
FIG. 1B is a schematic cross-sectional view of the dual hardness steel article embodiment shown in FIG. 1A.

FIG. 1A is a schematic perspective view, and FIG. 1B is a schematic cross-sectional view of a non-limiting embodiment of a dual hardness steel article 10 according to the present disclosure. Dual hardness steel article 10 may be used as a dual hardness armor. Dual hardness steel article 10 comprises a layer of a first air hardenable steel armor alloy 12 having a first alloy hardness, and a layer of a second air hardenable steel alloy 14 having a second alloy hardness. In a non-limiting embodiment, the first alloy hardness is greater than the second alloy hardness. A metallurgical bond region 16 attaches at least a region of the first air hardenable steel armor alloy 12 and at least a region of the second air hardenable steel armor alloy 14. As used herein, a "metallurgical bond" refers to bonding of the alloys by diffusion, welding, alloying, or intermolecular or intergranular attraction between the alloys in an interfacial region. In the metallurgical bond region 16, the first air hardenable steel armor alloy is inter-diffused with the second air hardenable steel armor alloy, thereby securing the two alloys together. Those having ordinary skill will understand the nature of and techniques that may be used for forming a metallurgical bond region between two steel alloys in order to secure the two steel alloys together. In a non-limiting embodiment, the metallurgical bond region has a thickness in the range of about 750 µm to about 1500 µm. It will be understood, however, that a metallurgical bond region of any suitable thickness may be formed to secure together the first air hardenable steel armor alloy 12 and the second air hardenable steel alloy 14.

In certain non-limiting embodiments according to the present disclosure, the first air hardenable steel armor alloy has a hardness of at least 574 BHN. A non-limiting example of an air hardenable UHH steel armor alloy, or 600 BHN steel armor alloy, having a hardness of at least 574 BHN when air hardened is ATI 600-MIL® Ultra High Hard Specialty Steel Armor, which is available from ATI Defense, Washington, Pa. USA, and which is disclosed in pending U.S. patent application Ser. No. 12/184,573, which is incorporated by reference herein in its entirety. ATI 600-MIL® Ultra High Hard Specialty Steel Armor comprises, in percent by weight, 0.42 to 0.52 carbon, 3.75 to 4.25 nickel, 1.00 to 1.50 chromium, 0.22 to 0.37 molybdenum, 0.20 to 1.00 manganese, 0.20 to 0.50 silicon, up to 0.020 phosphorus, up to 0.005 sulfur, balance iron, and incidental impurities. In a non-limiting embodiment, the impurities consist of residual elements as per U.S. Military Specification MIL-DTL-32332 requirements.

In certain non-limiting embodiments according to the present disclosure, the second air hardenable steel armor alloy has a hardness in the range of 477 BHN to 534 BHN, inclusive. A non-limiting example of an air hardenable steel alloy armor having a hardness in the range of 477 BHN to 534 BHN, inclusive, is ATI 500-MIL® High Hard Specialty Steel Armor, which also is available from ATI Defense. ATI 500-MIL® High Hard Specialty Steel Armor comprises, in percent by weight, 0.22 to 0.32 carbon, 3.50 to 4.00 nickel, 1.60 to 2.00 chromium, 0.22 to 0.37 molybdenum, 0.80 to 1.20 manganese, 0.25 to 0.45 silicon, up to 0.020 phosphorus, up to 0.005 sulfur, balance iron, and incidental impurities. In a non-limiting embodiment, the impurities consist of residual elements as per U.S. Military Specification MIL-DTL-46100E requirements. In certain non-limiting embodiments according to the present disclosure, the first air hardenable steel armor alloy has a hardness of at least 574 BHN, and the second air hardenable steel armor alloy has a hardness in the range of 477 BHN to 534 BHN, inclusive.

Again referring to FIGS. 1A and 1B, dual hardness steel article 10 may be in the form of, for example, a dual hardness steel armor plate fabricated from air hardenable steel alloys having different hardness values. The front side 18 of the dual hardness steel armor article or armor 10 includes the first air hardenable steel armor alloy 12, which has a relatively high hardness value. Front side 18 includes a "strike face", which is an exposed face of the first air hardenable steel armor alloy 12. A ballistic projectile breaks up and/or flattens on contacting the front side 18. The back side 19, or backing plate of the dual hardness air hardenable steel armor plate 10 comprises the second steel armor alloy 14, which exhibits lower hardness than the first air hardenable steel armor alloy 12. The softer and more ductile back side 19 serves to capture fragments of the projectile passing through front side 18 and absorbs energy of an impacting projectile after the projectile impacts the strike face. While not wishing to be held to any particular theory of operation, it is believed that the presence of the back side 19 and the metallurgical bond between the first and second air hardenable steel armor alloys 12,14 inhibits cracking and/or propagation of cracks in the relatively hard front side 18 when impacted by a ballistic projectile.

In a non-limiting embodiment, the first air hardenable steel armor alloy 12 of the front side 18 of the dual hardness steel article or armor 10 has a Rockwell C hardness of 58 to 65 Rc. In another non-limiting embodiment, the second air hardenable steel armor alloy 14, comprising the back side 19 or backing plate of the dual hardness steel article or armor 10 has a Rockwell C hardness of 45 to 55 Rc. In yet another embodiment, the difference between the Rockwell C hardness of the first air hardenable steel armor alloy 12 and the second air hardenable steel armor alloy 14 is about 10 to 15 Rc points.

In another non limiting embodiment, the first air hardenable steel armor alloy 12 of the front side 18 of the dual hardness steel article 10 may conform to U.S. Military Specification MIL-DTL-32332 (MR). In another non-limiting embodiment, the second air hardenable steel armor alloy 14 comprising the back side 19 or backing plate of the dual hardness steel article 10 conforms to U.S. Military Specification MIL-DTL-46100E (MR).

It is within the scope of the present disclosure to metallurgically bond together any suitable combination of different air hardenable steel armor alloys that are known now or hereinafter to a person of ordinary skill in the art to provide a dual hardness steel article. For example, in certain non-limiting embodiments, an air hardenable 400 BHN steel armor alloy may be metallurgically bonded to an air hardenable 500 BHN steel armor alloy or to an air hardenable 600 BHN steel armor alloy. In any such cases, the harder alloy would serve as the first air hardenable steel armor alloy and the first side, which typically would be exposed toward the ballistic threat so as to be initially contacted by an incoming ballistic projectile.

Table 1 lists several non-limiting embodiments of dual hardness articles according to the present disclosure that may be fabricated by a method including metallurgically bonding together combinations of air hardenable steel armor alloys of differing hardness. In each such combination of air hardenable steel armor alloys listed in Table 1, with reference to the non-limiting embodiment of article 10 illustrated in FIGS. 1A and 1B, for example, the alloy of the particular combination exhibiting greater hardness would serve as the first air hardenable steel armor alloy 12 included in front side 18, and the alloy exhibiting lower hardness would serve as the second air hardenable steel armor alloy included in back side 19. The references in Table 1 to 400, 500, 600, and 700, respectively, are to an air hardenable 400 BHN steel armor alloys, an air hardenable 500 BHN steel armor alloy, an air hardenable 600 BHN steel armor alloy, and an air hardenable 700 BHN steel armor alloy. In combinations in Table 1 in which like alloy types are combined as the first and second air hardenable steel armor alloys (e.g., "500/500"), the first air hardenable steel armor alloy, which is included in the first side 18 of plate 10, will have greater hardness than the second air hardenable steel armor alloy, which is included back side 19.

TABLE 1

| Second Air Hardenable Steel Armor Alloy | First Air Hardenable Steel Armor Alloy (BHN Alloy Type) | | |
|---|---|---|---|
| (BHN Alloy Type) | 500 | 600 | 700 |
| 400 | 500/400 | 600/400 | 700/400 |
| 500 | 500/500 | 600/500 | 700/500 |
| 600 |  | 600/600 | 700/600 |

Referring to Table 1, certain non-limiting embodiments of a dual hardness steel armor plate or other dual hardness steel article according to the present disclosure combine the following two air hardenable alloy types as the first air hardenable steel alloy and the second air hardenable steel alloy, respectively: 400 BHN steel alloy (higher hardness)+400 BHN steel alloy (lower hardness); 500 BHN steel alloy+400 BHN steel alloy; 500 BHN steel alloy (higher hardness)+500 BHN steel alloy (lower hardness); 600 BHN steel alloy+400 BHN steel alloy; 600 BHN steel alloy+500 BHN steel alloy; 600 BHN steel alloy (higher hardness)+600 BHN steel alloy (lower hardness); 700 BHN steel alloy+400 BHN steel alloy; 700 BHN steel alloy+500 BHN steel alloy; 700 BHN steel alloy+600 BHN steel alloy; and 700 BHN steel alloy (higher hardness)+700 BHN steel alloy (lower hardness).

In certain non-limiting embodiments according to the present disclosure, the second air hardenable steel alloy comprises an air hardenable auto-tempering steel. As used herein, "auto-tempering steel" refers to a steel in which carbon in the steel is partially precipitated from portions of the martensitic phase during air cooling, forming a fine dispersion of iron carbides in an α-iron matrix that increase the toughness of the steel alloy. In certain non-limiting embodiments according to the present disclosure, an auto-tempering steel included as the second air hardenable steel alloy exhibits room temperature tensile properties including tensile strength of at least 260 ksi (1,792 MPa), yield strength of at least 150 ksi (1,034 MPa), and elongation of at least 13%. In another non-limiting embodiment according to the present disclosure, an auto-tempering steel included as the second air hardenable steel alloy exhibits room temperature tensile properties including tensile strength of at least 240 ksi (1,655 MPa), yield strength of at least 140 ksi (965 MPa), and elongation of at least 9%. In certain non-limiting embodiments, an air hardenable auto-tempering steel that may be used as the second air hardenable steel alloy in dual hardness steel articles according to the present disclosure has the minimum Charpy V-notch impact properties listed in Table 2, as measured according to standard test methods listed in ASTM A370-10. The Charpy V-notch impact test is a fast strain rate impact test that measures a steel alloy's ability to absorb energy, thereby providing a measure of the toughness of the steel alloy.

TABLE 2

| Charpy V-Notch Impact Properties (typical) | | |
|---|---|---|
|  | Specimen Width 0.200 inch (5 mm) | Specimen Width 0.275 inch (7 mm) |
| Room Temperature | | |
| Energy | 24 ft · lbs (32.6 J) | 28 ft · lbs (38.0 J) |
| Lateral Expansion | 0.005 inch (0.1 mm) | 0.005 inch (0.1 mm) |
| −40° F. (−40° C.) | | |
| Energy | 20 ft · lbs (27.1 J) | 20 ft · lbs (27.1 J) |
| Lateral Expansion | 0.004 inch (0.1 mm) | 0.004 inch (0.1 mm) |

In another non-limiting embodiment according to this disclosure, an air hardenable auto-tempering steel that may be used as the second air hardenable steel alloy in dual hardness steel articles according to the present disclosure is ATI 500-MIL® High Hard Specialty Steel Armor. In another non-limiting embodiment, an air-tempering steel that may be included as the second air hardenable steel alloy in certain dual hardness steel articles according to the present disclosure is Grade AISI 4820 steel alloy (UNS G48200) having nominal composition ranges, in weight percentages, of 0.18-0.23% carbon, 0.50-0.70% manganese, up to 0.035% phosphorus, up to 0.04% sulfur, 0.15-0.30% silicon, 3.25-3.75% nickel, 0.20-0.30% molybdenum, iron and incidental impurities, and having properties as listed in ASTM A29/A29M-05.

In certain non-limiting embodiments of a dual hardness steel article according to the present disclosure, at least one of the first air hardenable steel alloy and the second air hardenable steel alloy comprises an air hardenable nickel-molybdenum-chromium steel alloy. In certain non-limiting embodiments of a dual hardness steel article according to the present disclosure, the first air hardenable steel alloy is a nickel-molybdenum-chromium steel alloy that comprises, consists essentially of, or consists of, in percent by weight, 0.42 to 0.52 carbon, 3.75 to 4.25 nickel, 1.00 to 1.50 chromium, 0.22 to 0.37 molybdenum, 0.20 to 1.00 manganese, 0.20 to 0.50 silicon, up to 0.020 phosphorus, up to 0.005 sulfur, iron, and impurities. In certain other non-limiting embodiments of a dual hardness steel article according to the present disclosure, the first air hardenable steel alloy is a nickel-molybdenum-chromium steel alloy that comprises, consists essentially of, or consists of, in percent by weight, 0.22 to 0.32 carbon, 3.50 to 4.00 nickel, 1.60 to 2.00 chromium, 0.22 to 0.37 molybdenum, 0.80 to 1.20 manganese, 0.25 to 0.45 silicon, up to 0.020 phosphorus, up to 0.005 sulfur, iron, and incidental impurities.

An aspect according to the present disclosure is directed to articles of manufacture comprising or consisting of a dual hardness steel alloy article comprising air hardenable steel alloys according to the present disclosure. In certain non-limiting embodiments, the article of manufacture is selected from an armor, a blast-protective vehicle hull, a V-shaped blast-protective vehicle hull, a blast-protective vehicle underbelly, and a blast-protective enclosure.

An additional aspect according to the present disclosure is directed to methods of manufacturing a dual hardness steel article such as, for example, a dual hardness steel armor in the form of a plate or other article. With reference to the flowchart of FIG. 2, one non-limiting embodiment of a method 20 according to the present disclosure for making a dual hardness steel armor includes providing (step 21 in FIG. 2) a first air hardenable steel alloy part comprising a first mating surface and having a first part hardness, and providing (22) a second air hardenable steel alloy part comprising a second mating surface and having a second part hardness. In certain non-limiting embodiments of method 20, the first part hardness is greater than the second part hardness. In various non-limiting embodiments of method 20, each first air hardenable steel alloy part and second air hardenable steel alloy part is independently chosen from a plate, a slab, a sheet, and a casting of an air hardenable steel alloy. Again referring to FIG. 2, the first air hardenable steel alloy part and the second air hardenable steel alloy part are positioned (23) so that at least a portion of the first mating surface contacts at least a portion of the second mating surface. In a non-limiting embodiment the entire portion of the first mating surface contacts the entire portion of the second mating surface. The first air hardenable steel alloy part is metallurgically secured to the second air hardenable steel alloy part (24) to form a metallurgically secured assembly. The metallurgically secured assembly is hot rolled (25) to provide a metallurgical bond region between all or a portion of the first mating surface and the second mating surface, thereby metallurgically bonding together the first air hardenable steel alloy part and the second air hardenable steel alloy part. The hot rolled assembly is cooled (26). In certain non-limiting embodiments, at least a portion of at least one of the first mating surface and the second mating surface optionally is ground prior to the positioning step (23).

Figure 2:
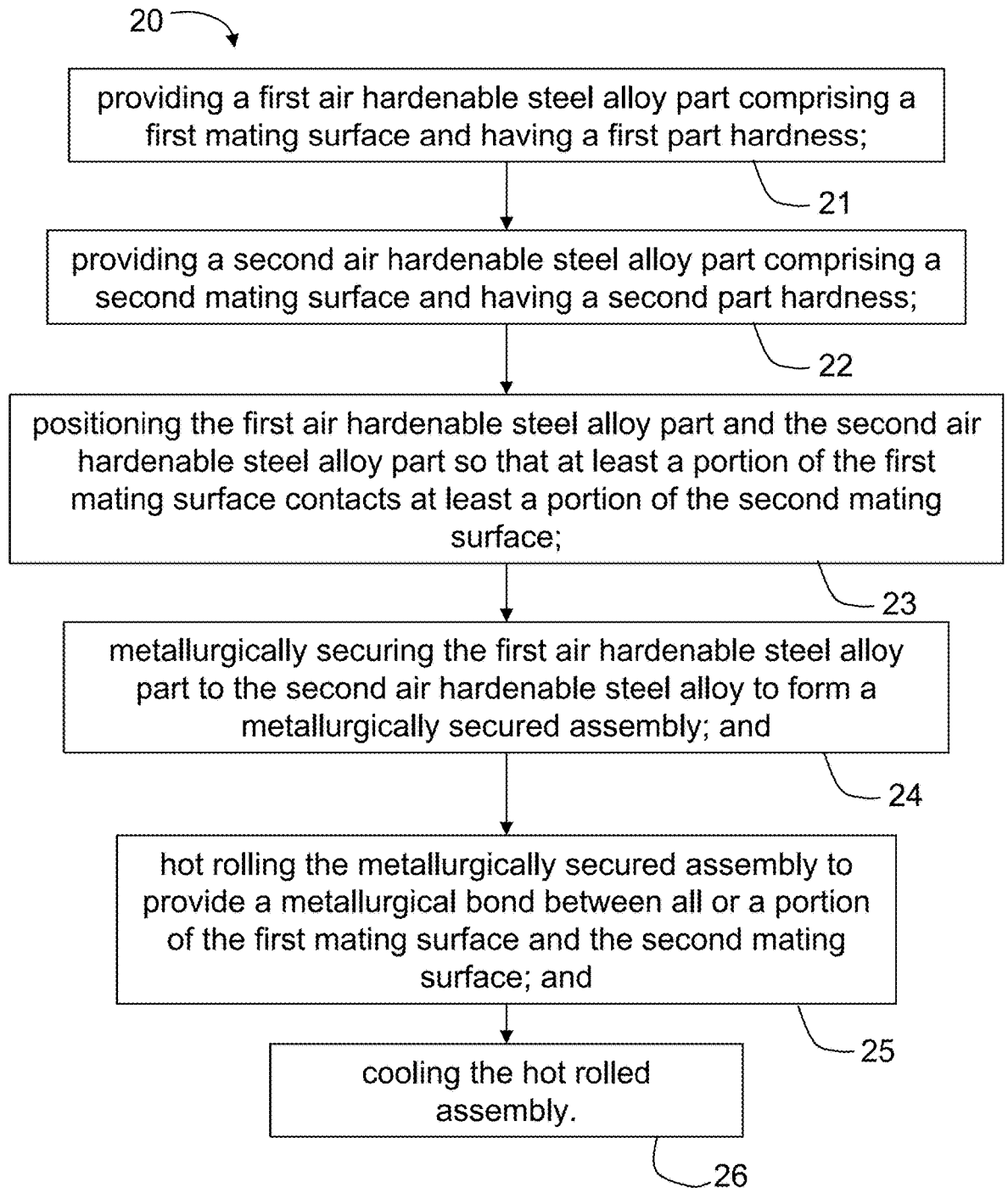
FIG. 2 is a flow chart of a non-limiting embodiment of a method of making a dual hardness steel article according to the present disclosure.

As noted, in method 20 of FIG. 2 the first air hardenable steel alloy part is metallurgically secured to the second air hardenable steel alloy part to form a metallurgically secured assembly prior to hot rolling. As used herein, "metallurgically securing" refers to bonding of the alloys by diffusion, alloying, intermolecular or intergranular attraction between the alloys or between the alloys and a welding alloy. The intermediate article produced by metallurgically securing the first and second air hardenable steel alloy parts together is referred to herein as a metallurgically secured assembly or welded assembly for ease of reference. In certain non-limiting embodiments of a method according to the present disclosure, metallurgically securing the first air hardenable steel alloy part to the second air hardenable steel alloy part comprises securing the first and second air hardenable steel alloy parts together by welding together at least a region of the periphery of the first mating surface and at least a region of the periphery of the second mating surface. In certain non-limiting embodiments, metallurgically securing the first air hardenable steel alloy part to the second air hardenable steel alloy part comprises welding together the entire periphery of the first mating surface and the entire periphery of the second mating surface. Metallurgically securing (24) the first and second air hardenable steel alloy parts together properly positions the two parts so that they may be metallurgically bonded together by a subsequent hot rolling step. Given this fact, it is not necessary to weld or otherwise metallurgically secure together the entire periphery of the first mating surface and entire periphery of the second mating surface.

In another non-limiting embodiment, metallurgically securing the first air hardenable steel alloy part to the second air hardenable steel alloy part to form a metallurgically secured assembly comprises explosive bonding at least a region of the first mating surface and at least a region of the second mating surface. The process of explosive bonding of metals and metal alloys is known to a person having ordinary skill in the art and need not be elaborated further herein.

In certain non-limiting embodiments of the method 20, prior to metallurgically securing the first and second air hardenable steel alloy parts (24), it may be necessary or desirable to prepare the first and second mating surfaces by, for example, grinding all or a portion of one or both surfaces. In certain non-limiting embodiments of method 20, prior to hot rolling the metallurgically secured assembly, it may be desirable to evacuate air between the first and second mating surfaces in the metallurgically secured assembly. These additional steps may better ensure formation of a suitable metallurgical bond between the first and second air hardenable steel alloy parts when hot rolling the metallurgically secured assembly. Those having ordinary skill will be able, without undue experimentation, to determine whether such pre-hot rolling steps are necessary or desirable.

Again referring to FIG. 2, method 20 includes hot rolling (25) the metallurgically secured assembly to form a metallurgical bond between at least a portion of the first mating surface of the first air hardenable steel alloy part and at least a portion of the second mating surface of the second air hardenable steel alloy part. In certain non-limiting embodiments of method 20, hot rolling (25) comprises hot rolling the metallurgically secured assembly at a hot rolling temperature in the range of about 700° F. (371.1° C.) to about 2100° F. (1149° C.), inclusive. In a non-limiting embodiment the minimum temperature of the hot rolled assembly coming off the rolling mill during final hot rolling is about 700° F. (371.1° C.). In another non-limiting embodiment, hot rolling (25) is conducted with the metallurgically secured assembly at a hot rolling temperature that is greater than $0.5T_m$ and is up to the highest temperature at which no incipient melting of the first and second air hardenable steel alloy part occurs, wherein $T_m$ is the melting temperature of the air hardenable steel alloy part having the highest melting temperature in the metallurgically secured assembly. The hot rolling (25) of the metallurgically secured assembly is conducted to metallurgically bond together the first and second air hardenable steel alloy parts along all or a portion of their interface, thereby providing a dual hardness steel alloy part with suitable integrity. The hot rolling produces a metallurgical bond region in which the first and second air hardenable steel alloys are interdiffused. Those having ordinary skill, upon reading the present disclosure, can determine a suitable hot rolling temperature without undue experimentation. Additionally, given that the technique of hot rolling an assembly of steel alloy parts to metallurgically bond together the parts along an interface is known to those having ordinary skill, the hot rolling step according to the methods of the present disclosure can be conducted successfully by ordinarily skilled persons without further discussion herein.

In certain non-limiting embodiments of method 20, hot rolling the metallurgically secured assembly (25) comprises hot rolling the assembly to a suitable thickness for use as a dual hardness steel armor plate or other article. Non-limiting examples of possible article thicknesses range from, for example, a 0.040 inch (0.102 cm) thick sheet to a 3 inch (7.62 cm) thick plate. In other non-limiting embodiments of method 20, hot rolling the metallurgically secured assembly comprises hot rolling the assembly to an intermediate thickness, grit blasting at least one exterior surface of the assembly, and further hot rolling the grit blasted assembly to a suitable thickness for use as a dual hardness steel armor plate or other article. Such other articles include, for example, articles selected from a blast-protective vehicle hull, a V-shaped blast-protective vehicle hull, a blast-protective vehicle underbelly, and a blast-protective enclosure.

In certain non-limiting embodiments of method 20, hot rolling the metallurgically secured assembly results in a metallurgical bond along substantially the entire interface of the opposed first and second mating surfaces of the first air hardenable steel alloy and the second air hardenable steel alloy, respectively. In such case, the resulting dual hardness steel article may have the structure, for example, of the article 10 schematically depicted in FIGS. 1A and 1B, wherein metallurgical bond region 16 is produced on hot rolling and extends along substantially the entire interface between the first air hardenable steel alloy 12 and the second air hardenable steel alloy 14.

As the air hardenable steel alloys of the hot rolled assembly cool in air from the hot rolling temperature, the alloys harden to the desired hardnesses, without the need for post-roll bonding steps to achieve high hardness. For example, a 400 BHN steel alloy included as the first or second air hardenable steel alloy in the hot rolled assembly will develop hardness of 212-388 BHN on cooling in ambient air from the hot rolling temperature. A 500 BHN steel alloy included as the first or second air hardenable steel alloy in the hot rolled assembly will develop hardness of 477-535 BHN on cooling in ambient air from the hot rolling temperature. A 600 BHN steel alloy included as the first or second air hardenable steel alloy in the hot rolled assembly will develop a minimum hardness of 570 BHN on cooling in ambient air from the hot rolling temperature. Because air hardenable steel armor alloys such as, for example, 400 BHN, 500 BHN, 600 BHN, and 700 BHN steel armor alloys, do not require post roll-bonding steps such as austenizing, and oil quenching, the dual hardness steel alloy articles made according to methods of the present disclosure can be manufactured to a size limited only by the available hot rolling equipment, while maintaining the desired ballistic resistance properties. Because the conventional post-hot rolling step of oil quenching is not required to achieve the desired hardness in air hardenable alloys as used in the articles and methods of the present disclosure, it may not be necessary to flatten the dual hardness steel alloy articles made by methods as discussed herein. Tempering articles of the present disclosure may be unnecessary for certain applications, but still may be necessary for others. Tempering may improve the performance of the article by increasing the toughness of the article. When flattening is required, it will be required to a lesser degree because heat treatment distortion as a result of embodiments of the methods of this disclosure will be less than oil quenched materials. In addition, because of the air hardenable nature of alloys used in the present methods and articles, mechanical sawing of dual hardness steel alloy articles as disclosed herein does not result in warping of the articles.

The examples that follow are intended to further describe certain non-limiting embodiments, without restricting the scope of the present invention. Persons having ordinary skill in the art will appreciate that variations of the following examples are possible within the scope of the invention, which is defined solely by the claims.

Example 1

In a non-limiting example of a dual hardness air hardenable steel armor according to the present disclosure, ATI 600-MIL® Ultra High Hard Specialty Steel Armor Alloy is used for the front or strike side of the armor, and ATI 500® High Hard Specialty Steel Armor Alloy is used as the back side or backing plate of the armor. Ingot surfaces are ground using conventional practices. Ingots or continuously cast "concast" slab of the two alloys are heated to a first temperature of about 1300° F. (704° C.), equalized, held at the first temperature for 6 to 8 hours, heated at about 150° F./hour (66° C./hour) up to a second temperature of about 2050° F. (1121° C.), and held at the second temperature for about 30 minutes or more per inch of thickness. As an example, the ATI 600-MIL® steel armor alloy ingot is hot rolled to an oversize 2.80 inches (7.11 cm) thick slab. The ATI 500-MIL® steel armor alloy ingot is hot rolled to an oversize 3.30 inches (8.38 cm) thick slab. The slabs are stress relieved at 1250° F. (676.7° C.) for a minimum of 12 hours. Patterns of each slab are saw cut to the same width and length for assembly matching. Each slab is flattened and milled to gauge. As an example, the ATI 600-MIL® steel armor slab is milled to a thickness of 2.50 inches (6.35 cm), and the ATI 500-MIL® steel armor slab is milled to a thickness of 3.00 inches (7.62 cm). The milled ingots' surfaces are cleaned thoroughly to remove any foreign matter such as oil and lubricants.

A bevel is machined on a peripheral edge of each slab to facilitate welding. The slabs are shot-blast using conventional procedures. For storage, the slabs are covered with paper and stored indoors to inhibit oxidation. Slabs that are not welded within seven days are shot blasted again to remove any oxidation. An ATI 600-MIL® steel armor slab is disposed on an ATI 500-MIL® steel armor slab, and the slabs are welded together at aligned beveled edges using low hydrogen welding rod or wire (7018 designation for welding) to provide a metallurgically secured assembly of the two slabs.

The welded (metallurgically secured) assembly is stamped to identify the hard side, i.e., the ATI 600-MIL® steel armor side, and the assembly is heated to 2200° F. (1204° C.) or less and held at temperature for 30 to 45 minutes or more per inch of assembly (11.8 to 17.7 minutes or more per cm of assembly). The assembly is then rolled to a reslab with the ATI 600-MIL® steel armor side as the top side to a thickness in the 3.5 inch (8.9 cm) to 5.0 inch (12.7 cm) range.

The rolled reslab assembly is conventionally shot blasted with the hard side up, and is then heated to 1750° F. (954.4° C.), held for 30 to 45 minutes per inch of assembly (11.8 to 17.7 minutes per cm of assembly), and rolled to finished thickness. The rolled assembly is normalized at 1600° F.±200° F. (871.1° C.±93° C.), air cooled, and flattened, if necessary. Flattening may include conventional flattening procedures, or may include applying tensile or compressive stresses to the rolled assembly sufficient to maintain flatness during the normalizing treatment, as disclosed in U.S. patent application Ser. No. 12/565,809, which is incorporated by reference herein in its entirety. Flattening may or may not be necessary in certain non-limiting embodiments of methods of making dual hardness steels according to the present disclosure. Even if flattening is required in certain embodiment of methods herein, however, it may be required to a lesser degree than in conventional methods because of reduced heat treatment distortion in embodiments of the methods herein.

The rolled assembly is tempered at temperatures between 175° F. (79.4° C.) to 250° F. (121° C.) for 30 minutes to 120 minutes. The dual hardness air hardenable steel armor thus produced is shot blasted and water jet or abrasive cut to desired size.

The present disclosure has been written with reference to various exemplary, illustrative, and non-limiting embodiments. However, it will be recognized by persons having ordinary skill in the art that various substitutions, modifications, or combinations of any of the disclosed embodiments (or portions thereof) may be made without departing from the scope of the invention as defined solely by the claims. Thus, it is contemplated and understood that the present disclosure embraces additional embodiments not expressly set forth herein. Such embodiments may be obtained, for example, by combining and/or modifying any of the disclosed steps, ingredients, constituents, components, elements, features, aspects, and the like, of the embodiments described herein. Thus, this disclosure is not limited by the description of the various exemplary, illustrative, and non-limiting embodiments, but rather solely by the claims. In this manner, it will be understood that the claims may be amended during prosecution of the present patent application to add features to the claimed invention as variously described herein.

We claim:

1. A dual-hardness steel plate, comprising:
   a first portion comprising a first nickel-molybdenum-chromium, air-hardenable steel alloy having a first hardness of at least 574 Brinell Hardness Number (BHN); and
   a second portion metallurgically-bonded to the first portion, the second portion comprising a second nickel-molybdenum-chromium, air-hardenable steel alloy having a second hardness less than 574 BHN.

2. The dual-hardness steel plate of claim 1, wherein:
   the first air-hardenable steel alloy has a hardness of at least 574 BHN; and
   the second air-hardenable steel alloy has a hardness in a range of 477 BHN to 534 BHN, inclusive.

3. The dual-hardness steel plate of claim 1, wherein:
   the first air-hardenable steel alloy comprises a 600 BHN steel alloy type or a 700 BHN steel alloy type; and
   the second air-hardenable steel alloy comprises a 400 BHN steel alloy type or a 500 BHN steel alloy type.

4. The dual-hardness steel plate of claim 1, wherein the first air-hardenable steel alloy has a first hardness of 55 to 65 Rc.

5. The dual-hardness steel plate of claim 1, wherein the second air-hardenable steel alloy has a second hardness of 45 to 55 Rc.

6. The dual-hardness steel plate of claim 5, wherein the first air-hardenable steel alloy has a first hardness that is 10 to 15 Rc points greater than the second hardness.

7. The dual-hardness steel plate of claim 1, wherein the first air-hardenable steel alloy comprises, in percent by weight:
   0.42 to 0.52 carbon;
   3.5 to 4.25 nickel;
   1.00 to 1.50 chromium;
   0.22 to 0.37 molybdenum;
   0.20 to 1.00 manganese;
   0.20 to 0.50 silicon;
   up to 0.020 phosphorus;
   up to 0.005 sulfur;
   iron; and
   impurities.

8. The dual-hardness steel plate of claim 1, wherein the second air-hardenable steel alloy comprises, in percent by weight:
   0.22 to 0.32 carbon;
   3.50 to 4.00 nickel;
   1.60 to 2.00 chromium;
   0.22 to 0.37 molybdenum;
   0.80 to 1.20 manganese;
   0.25 to 0.45 silicon;
   up to 0.020 phosphorus;
   up to 0.005 sulfur,
   iron; and
   impurities.

9. The dual-hardness steel plate of claim 1, wherein the first air-hardenable steel alloy consists of, in percent by weight:
   0.42 to 0.52 carbon;
   3.75 to 4.25 nickel;
   1.00 to 1.50 chromium;
   0.22 to 0.37 molybdenum;
   0.20 to 1.00 manganese,
   0.20 to 0.50 silicon;
   up to 0.020 phosphorus;
   up to 0.005 sulfur;
   iron;
   and impurities.

10. The dual-hardness steel plate of claim 1, wherein the second air-hardenable steel alloy consists of, in percent by weight:
    0.22 to 0.32 carbon;
    3.50 to 4.00 nickel;
    1.60 to 2.00 chromium;
    0.22 to 0.37 molybdenum;
    0.80 to 1.20 manganese;
    0.25 to 0.45 silicon;
    up to 0.020 phosphorus;
    up to 0.005 sulfur;
    iron; and
    impurities.

11. The dual-hardness steel plate of claim 1, wherein the first air-hardenable steel alloy conforms to specification MIL-DTL-32332 (MR).

12. The dual-hardness steel plate of claim 1, wherein the second air-hardenable steel armor alloy conforms to specification MIL-DTL-461 00E (MR).

13. An article comprising the dual-hardness steel plate of claim 1, wherein the article is selected from the group consisting of a steel armor plate, a blast-protective hull, a blast-protective vehicle underbelly, and a blast-protective enclosure.

14. A dual-hardness steel plate, comprising:
    a first portion comprising a first nickel-molybdenum-chromium, air-hardenable steel alloy having a first hardness of at least 574 Brinell Hardness Number (BHN), wherein the first air-hardenable steel alloy comprises, in percent by weight:
    0.42 to 0.52 carbon;
    3.75 to 4.25 nickel;
    1.00 to 1.50 chromium;
    0.22 to 0.37 molybdenum;
    0.20 to 1.00 manganese;
    0.20 to 0.50 silicon;
    up to 0.020 phosphorus;
    up to 0.005 sulfur;
    iron; and
    impurities; and
    a second portion metallurgically-bonded to the first portion, the second portion comprising a second nickel-molybdenum-chromium, air-hardenable steel alloy having a second hardness in a range of 477 BHN to 534 BHN, inclusive.

15. A dual-hardness steel plate, comprising:
    a first portion comprising a first air-hardenable steel alloy having a first hardness of at least 574 Brinell Hardness Number (BHN) and comprising, in percent by weight:
    0.42 to 0.52 carbon,
    3.75 to 4.25 nickel,
    1.00 to 1.50 chromium,
    0.22 to 0.37 molybdenum,
    0.20 to 1.00 manganese,
    0.20 to 0.50 silicon,
    up to 0.020 phosphorus,
    up to 0.005 sulfur,
    iron, and
    impurities; and
    a second portion metallurgically-bonded to the first portion, the second portion comprising a second air-hardenable steel alloy having a second hardness in a range of 477 BHN to 534 BHN, inclusive, and comprising, in percent by weight:
0.22 to 0.32 carbon,
3.50 to 4.00 nickel,
1.60 to 2.00 chromium,
0.22 to 0.37 molybdenum,
0.80 to 1.20 manganese,
0.25 to 0.45 silicon,
up to 0.020 phosphorus,
up to 0.005 sulfur,
iron, and
impurities.

* * * * *